United States Patent [19]
Seeley

[11] 4,320,158
[45] Mar. 16, 1982

[54] COMPOSITE LABEL WEB ROLL

[75] Inventor: William J. Seeley, Bellbrook, Ohio

[73] Assignee: Monarch Marking Systems, Inc., Dayton, Ohio

[21] Appl. No.: 154,679

[22] Filed: May 30, 1980

[51] Int. Cl.[3] .......................... B32B 3/10; B32B 3/16
[52] U.S. Cl. ...................................... 428/42; 40/2 R; 156/DIG. 33; 283/21; 428/40; 428/41; 428/43; 428/136; 428/138; 428/343; 428/906
[58] Field of Search ...................... 428/40, 41, 42, 43, 428/137, 138, 343, 906, 136; 156/344, 584, 541, 527, DIG. 33; 40/2 R; 283/21

[56] References Cited

U.S. PATENT DOCUMENTS

| | | | |
|---|---|---|---|
| 3,669,814 | 6/1972 | Faltin | 428/43 |
| 3,783,083 | 1/1974 | Jenkins | 161/38 |
| 4,094,438 | 6/1978 | Neubauer | 221/1 |

*Primary Examiner*—Paul J. Thibodeau
*Attorney, Agent, or Firm*—Joseph J. Grass

[57] ABSTRACT

There is disclosed a composite web roll of pressure sensitive labels especially suited for use with a label dispensing apparatus. The composite web includes a carrier web for a series of pressure sensitive labels. The carrier web includes longitudinally spaced groups of cuts arranged to provide entry of a toothed driver with only minimal force and yet the carrier web is not readily susceptible to tearing as the carrier web is pulled about a delaminator.

7 Claims, 4 Drawing Figures

COMPOSITE LABEL WEB ROLL

BACKGROUND OF THE INVENTION

1. Field of the Invention

This invention relates to the art of composite label webs which are adapted to be used in a label dispensing apparatus.

2. Brief Description of the Prior Art

Prior art composite webs are disclosed in U.S. Pat. Nos. 3,783,083 granted Jan. 1, 1974 to William A. Jenkins and 4,094,438 granted June 13, 1978 to Gilbert A. Neubauer. The Jenkins patent discloses cuts of various shapes in the supporting or carrier web and the Neubauer patent discloses Y-shaped cuts in the supporting or carrier web.

SUMMARY OF THE INVENTION

The invention relates to a composite label web for use in a label dispensing apparatus. The composite web includes a carrier web on which labels are releasably adhered by pressure sensitive adhesive. Label dispensing apparatus typically includes a delaminator at which the carrier web is caused to undergo a sharp change in direction. The carrier web of the invention has a series of longitudinally spaced groups of cuts to enable the carrier web to be advanced by a toothed driver. The cuts in the carrier web are arranged so to obviate tearing of the carrier web as the carrier web passes about the delaminator, but in addition the tooth of a toothed driver enters the web with only minimal force or resistance. More particularly, the cuts in the carrier web are arranged in longitudinally spaced groups, with each group including a first pair of lateral cuts converging toward a first point and away from the outer free end of the roll, and a longitudinal cut extending between the first and second points. The first and second pairs of cuts and the longitudinal cut define a flap projecting longitudinally in a trailing direction away from the other free end of the roll and a pair of laterally disposed flaps. The pressure sensitive adhesive which adheres the labels lightly to the carrier web enables the labels to be delaminated from the carrier web when the carrier web is drawn from the roll about a sharp angle. The carrier web at each group of cuts is engageable by a tooth of a toothed driver which can enter the web by folding the laterally disposed flaps out of the plane of the carrier web and by folding the longitudinally projecting flap out of the plane of the carrier web and drivingly engaging the driver with the longitudinally projecting flap. The longitudinally projecting flap trails as it passes about a sharp angle at the delaminator, thus tending to remain in the plane of the carrier web until being folded out of the plane by the tooth. The laterally disposed flaps make it as easy as possible to fold out of the plane of the supporting material but only when contacted by the tooth. In that the lateral cuts are inclined to the longitudinal direction of travel of the carrier web only one point at a time of each lateral cut passes about the delaminator.

DETAILED DESCRIPTION OF THE PREFERRED EMBODIMENT

Figure 1:
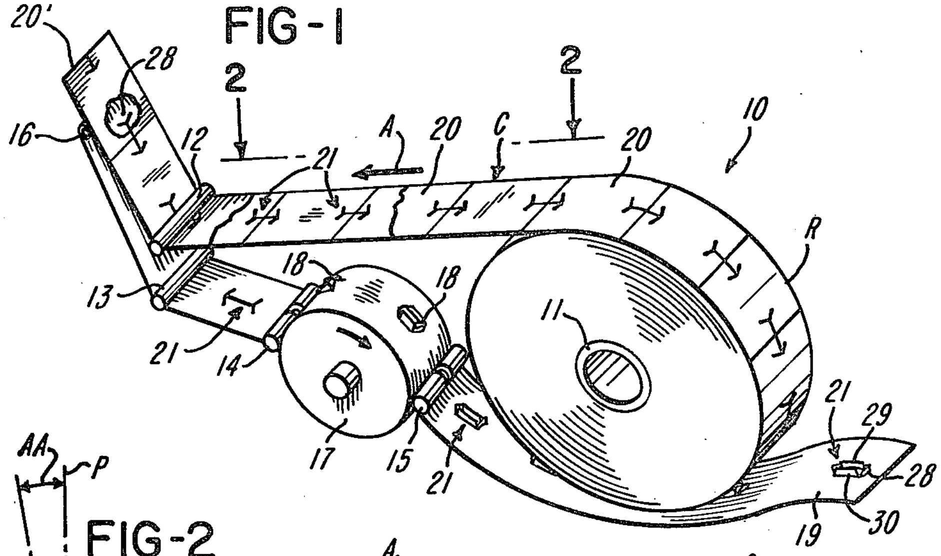
FIG. 1 is a perspective, diagrammatic, partially broken-away view of a label dispensing apparatus using the composite label web of the invention.

With reference to FIG. 1, there is shown a diagrammatic view of a label dispensing apparatus 10 which includes a support 11 for a roll R of a composite label web C, a series of guide rolls 12, 13, 14 and 15, a delaminator 16 and a toothed driver 17 having a series of teeth 18. The delaminator 16 can take the form of a small-diameter peel roller as shown or of a peel edge. The composite web C includes a carrier web 19 on which labels 20 are releasably adhered by pressure sensitive adhesive 21'. The composite web C is drawn off the outer periphery of the roll R upon rotation of the driver 17. As the composite web is drawn off the roll R it passes first in the direction of arrow A (FIG. 1 and 2) and then about roller 12. At the delaminator 16, the leading label 20' is peeled off the carrier web 19 progressively as the carrier web 19 progresses about the delaminator 16. From there the carrier web 19 passes about rollers 13 and 14, about the toothed driver 17, and about roller 15.

Figure 2:
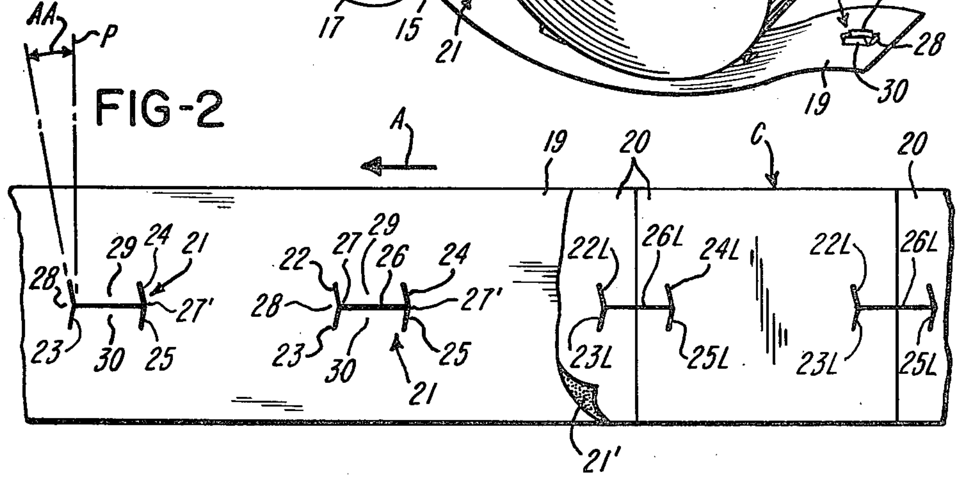
FIG. 2 is a top plan view of the composite label web taken along line 2—2 of FIG. 1.
Figure 3:
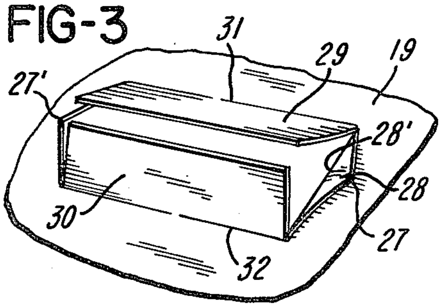
FIG. 3 is a perspective fragmentary view showing how the flaps of the carrier web have been folded out of the plane of the carrier web by the toothed driver.
Figure 4:
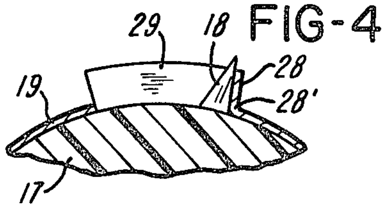
FIG. 4 is a longitudinal sectional view showing two of the three flaps and a cooperating tooth of the driver.

As shown in FIGS. 1 and 2, the carrier web 19 has group 21 of cuts. Each group 21 includes a pair of lateral knife cuts 22 and 23, a pair of lateral knife cuts 24 and 25, and a longitudinal cut 26. The cuts 22, 23, 24 and 25 of each group 21 make obtuse angles with respect to the respective longitudinal cut 26. Each of the cuts 22, 23, 24 and 25 makes a slight angle AA with respect to a line P which is perpendicular to the direction of extent of the composite web C. The cuts 26 are perpendicular to the line P. The labels 20 also have cuts 22L, 23L, 24L, 25L and 26L aligned with respective cuts 22, 23, 24, 25 and 26. The cuts 22L through 26L make the labels 20 more difficult to remove when applied to merchandise because they facilitate tearing.

It is noted that the cuts 22 and 23 converge toward a first point 27 and away from the outer free end of the roll R, and likewise the cuts 24 and 25 converge toward a second point 27' and away from the outer free end of the roll R.

The pairs of cuts 22 and 23, and 24 and 25 are in a chevron arrangement. Cuts 22, 23, 24, 25 and 26 provide three and only three flaps 28, 29 and 30. Each flap 28 projects longitudinally and the related flaps 29 and 30 are disposed laterally. As seen in FIGS. 1 and 2, the flaps 28 extend in the trailing direction away from the outer free end of the roll R. Therefore, the flaps 28 trail about the delaminator as the carrier web 19 is advanced. The flaps 28 therefore do not fold out of the plane of the carrier web 19 at the delaminator 16. It is only when a tooth 18 of the driver 17 contacts the web 19 at cut 26 that the web 19 opens up by folding flaps 29 and 30 about respective fold lines 31 and 32. When the advancing tooth 18 has folded the flaps 29 and 30, the tooth 18 drivingly engages the flap 28 and also folds the flap 28 out of the plane of the web 19 about fold line 28'.

The cuts 22, 23, 24 and 26 are preferably straight, as shown. Due to the inclination of the cuts 22, 23, 24 and 25, there is only one point of each cut 22, 23, 24 or 25 that passes about the delaminator at a time. This reduces the tendency of the carrier web 19 to tear.

By way of example, not limitation, the angle AA is preferably between 5 degrees and 15 degrees and most preferably about 10 degrees.

Other embodiments and modifications of this invention will suggest themselves to those skilled in the art, and all such of these as come within the spirit of this invention are included within its scope as best defined by the appended claims.

I claim:

1. A composite label web for use in a label dispensing apparatus, the composite web comprising: a carrier web of supporting material, a series of labels releasably adhered by pressure sensitive adhesive to the carrier web, the composite web being wound into a roll having an outer free end, longitudinally spaced groups of cuts in the carrier web, each group of cuts including a first pair of lateral cuts converging toward a first point and away from the outer free end of the roll, a second pair of lateral cuts spaced longitudinally from the first pair of cuts and converging toward a second point and away from the outer free end of the roll and a longitudinal cut extending between the first and second points, the first and second pairs of cuts and the longitudinal cut defining a flap projecting longitudinally in a trailing direction away from the outer free end of the roll and a pair of laterally disposed flaps, the pressure sensitive adhesive adhering the labels lightly to the carrier web to enable labels to be delaminated from the carrier web when the carrier web is drawn from the roll about a sharp angle, the carrier web at each group of cuts being engageable by a toothed driver which can enter the web by folding the laterally disposed flaps out of the plane of the carrier web and by folding the longitudinally projecting flap out of the plane of the carrier web and drivingly engaging the driver with the longitudinally projecting flap.

2. A composite label web for use in a label dispensing apparatus, the composite web comprising: a carrier web of supporting material, a series of labels releasably adhered by pressure sensitive adhesive to the carrier web, the composite web being wound into a roll having an outer free end, longitudinally spaced groups of cuts in the carrier web, each group of cuts including a first pair of lateral cuts converging toward a first point and away from the outer free end of the roll, a second pair of lateral cuts spaced longitudinally from the first pair of cuts and converging toward a second point and away from the outer free end of the roll and a longitudinal cut extending between the first and second points, the first and second pairs of cuts and the longitudinal cut defining a flap projecting longitudinally in a trailing direction away from the outer free end of the roll and a pair of laterally disposed flaps, the pressure sensitive adhesive adhering the labels lightly to the carrier web to enable labels to be delaminated from the carrier web when the carrier web is drawn from the roll about a sharp angle, the carrier web at each group of cuts being engageable by a toothed driver which can enter the web by folding the laterally disposed flaps out of the plane of the carrier web and by folding the longitudinally projecting flap out of the plane of the carrier web and drivingly engaging the driver with the longitudinally projecting flap, wherein the lateral cuts of the first pair make obtuse angles relative to the respective longitudinal cut, and wherein the lateral cuts of the second pair make acute angles relative to the respective longitudinal cut.

3. A composite label web for use in a label dispensing apparatus, the composite web comprising: a carrier web of supporting material, a series of labels releasably adhered by pressure sensitive adhesive to the carrier web, the composite web being wound into a roll having an outer free end, longitudinally spaced groups of cuts in the carrier web, each group of cuts including a first pair of lateral cuts converging toward a first point and away from the outer free end of the roll, a second pair of lateral cuts spaced longitudinally from the first pair of cuts and converging toward a second point and away from the outer free end of the roll and a longitudinal cut extending between the first and second points, the first pair of lateral cuts and the longitudinal cut meeting at the first point, the second pair of lateral cuts and the longitudinal cut meeting at the second point, the first and second pairs of cuts and the longitudinal cut defining a flap projecting longitudinally in a trailing direction away from the outer free end of the roll and a pair of laterally disposed flaps, the pressure sensitive adhesive adhering the labels lightly to the carrier web to enable labels to be delaminated from the carrier web when the carrier web is drawn from the roll about a sharp angle, the carrier web at each group of cuts being engageable by a toothed driver which can enter the web by folding the laterally disposed flaps out of the plane of the carrier web and by folding the longitudinally projecting flap out of the plane of the carrier web and drivingly engaging the driver with the longitudinally projecting flap.

4. A composite label web for use in a label dispensing apparatus, the composite web comprising: a carrier web of supporting material, a series of labels releasably adhered by pressure sensitive adhesive to the carrier web, the composite web being wound into a roll having an outer free end, longitudinally spaced groups of cuts in the carrier web, each group of cuts including a first pair of lateral cuts converging toward a first point and away from the outer free end of the roll, a second pair of lateral cuts spaced longitudinally from the first pair of cuts and converging toward a second point and away from the outer free end of the roll and a longitudinal cut extending between the first and second points, the first and second pairs of cuts and the longitudinal cut defining a flap projecting longitudinally in a trailing direction away from the outer free end of the roll and a pair of laterally disposed flaps, the pressure sensitive adhesive adhering the labels lightly to the carrier web to enable labels to be delaminated from the carrier web when the carrier web is drawn from the roll about a sharp angle, the carrier web at each group of cuts being engageable by a toothed driver which can enter the web by folding the laterally disposed flaps out of the plane of the carrier web and by folding the longitudinally projecting flap out of the plane of the carrier web and drivingly engaging the driver with the longitudinally projecting flap, wherein each lateral cut makes an angle of about 10 degrees with respect to a lateral line perpendicular to the longitudinal direction along the web.

5. A composite label web for use in a label dispensing apparatus, the composite web comprising: a carrier web of supporting material, a series of labels releasably adhered by pressure sensitive adhesive to the carrier web, the composite web being wound into a roll having an outer free end, longitudinally spaced groups of cuts in the carrier web, each group of cuts including a first pair of lateral cuts converging toward a first point and away from the outer free end of the roll, a second pair of lateral cuts spaced longitudinally from the first pair of cuts and converging toward a second point and away from the outer free end of the roll and a longitudinal cut extending between the first and second points, the first and second pairs of cuts and the longitudinal cut defining a flap projecting longitudinally in a trailing direction away from the outer free end of the roll and a pair of laterally disposed flaps, the pressure sensitive adhesive adhering the labels lightly to the carrier web to enable labels to be delaminated from the carrier web when the carrier web is drawn from the roll about a sharp angle, the carrier web at each group of cuts being engageable by a toothed driver which can enter the web by folding the laterally disposed flaps out of the plane of the carrier web and by folding the longitudinally projecting flap out of the plane of the carrier web and drivingly engaging the driver with the longitudinally projecting flap, wherein each lateral cut makes an angle of between 5 degrees and 15 degrees with respect to a lateral line perpendicular to the longitudinal direction along the web.

6. A composite label web for use in a label dispensing apparatus, the composite web comprising: a carrier web of supporting material, a series of labels releasably adhered by pressure sensitive adhesive to the carrier web, the composite web being wound into a roll having an outer free end, longitudinally spaced groups of cuts in the carrier web, each group of cuts including a first pair of straight lateral cuts converging toward a first point and away from the outer free end of the roll, a second pair of straight lateral cuts spaced longitudinally from the first pair of cuts and converging toward a second point and away from the outer free end of the roll and a longitudinal cut extending between the first and second points, the first and second pairs of cuts and the longitudinal cut defining a flap projecting longitudinally in a trailing direction away from the outer free end of the roll and a pair of laterally disposed flaps, the pressure sensitive adhesive adhering the labels lightly to the carrier web to enable labels to be delaminated from the carrier web when the carrier web is drawn from the roll about a sharp angle, the carrier web at each group of cuts being engageable by a toothed driver which can enter the web by folding the laterally disposed flaps out of the plane of the carrier web and by folding the longitudinally projecting flap out of the plane of the carrier web and drivingly engaging the driver with the longitudinally projecting flap.

7. A composite label web for use in a label dispensing apparatus, the composite web comprising: a carrier web of supporting material, a series of labels releasably adhered by pressure sensitive adhesive to the carrier web, the composite web being wound into a roll having an outer free end, longitudinally spaced groups of cuts in the carrier web, each group of cuts including a first pair of lateral cuts converging toward a first point and away from the outer free end of the roll, a second pair of lateral cuts spaced longitudinally from the first pair of cuts and converging toward a second point and away from the outer free end of the roll, wherein the first and second pairs of lateral cuts are in a chevron arrangement, and a longitudinal cut extending between the first and second points, the first and second pairs of cuts and the longitudinal cut defining a flap projecting longitudinally in a trailing direction away from the outer free end of the roll and a pair of laterally disposed flaps, the pressure sensitive adhesive adhering the labels lightly to the carrier web to enable labels to be delaminated from the carrier web when the carrier web is drawn from the roll about a sharp angle, the carrier web at each group of cuts being engageable by a toothed driver which can enter the web by folding the laterally disposed flaps out of the plane of the carrier web and by folding the longitudinally projecting flap out of the plane of the carrier web and drivingly engaging the driver with the longitudinally projecting flap.

* * * * *